United States Patent [19]
Fujinami et al.

[11] 3,871,342
[45] Mar. 18, 1975

[54] ELECTRONIC IGNITION TIMING CONTROL CIRCUIT FOR INTERNAL COMBUSTION ENGINE

[75] Inventors: Hiroshi Fujinami, Okazaki; Katuyuki Takagi, Ichinomiya, both of Japan

[73] Assignee: Nippon Soken, Inc., Nishio-shi, Aichi-ken, Japan

[22] Filed: Feb. 26, 1974

[21] Appl. No.: 445,902

[30] Foreign Application Priority Data
Feb. 27, 1973  Japan.............................. 23916/73

[52] U.S. Cl. .... 123/117 R, 123/146.5 A, 123/148 E
[51] Int. Cl. ............................................. F02p 5/08
[58] Field of Search..... 123/117 R, 117 A, 146.5 A, 123/148 E

[56] References Cited
UNITED STATES PATENTS

| | | | |
|---|---|---|---|
| 3,768,451 | 10/1973 | Okamoto ......................... | 123/117 A |
| 3,454,871 | 7/1969 | Nolting ............................. | 123/117 R |
| 3,521,611 | 7/1970 | Finch ................................. | 123/148 |
| 3,696,303 | 10/1972 | Hartig .............................. | 123/148 E |
| 3,705,573 | 12/1972 | Palazzetti et al............. | 123/146.5 A |
| 3,749,070 | 7/1973 | Oishi et al....................... | 123/117 R |
| 3,749,073 | 7/1973 | Asplund........................... | 123/117 R |
| 3,752,139 | 8/1973 | Asplund......................... | 123/146.5 A |
| 3,757,755 | 9/1973 | Carner............................. | 123/117 R |
| 3,799,136 | 3/1974 | Korteling ..................... | 123/146.5 A |

*Primary Examiner*—Charles J. Myhre
*Assistant Examiner*—Paul Devinsky
*Attorney, Agent, or Firm*—Cushman, Darby & Cushman

[57] ABSTRACT

There is provided a control circuit for electrically determining the ignition timing of an internal combustion engine. The most common type of the conventional spark-advance mechanisms is one in which the relative positions of a cam and contact points constituting a cam and electric contact assembly are varied in accordance with the number of revolutions of the engine and the magnitude of the intake manifold vacuum respectively detected by a centrifugal governor and a vacuum advancer to generate an ignition signal at an ignition point that suits the operating conditions of the engine. However, the spark-advance mechanism of this type is disadvantageous in that the wear of the cam and the contact points results in the alteration of the ignition timing, and moreover it is difficult to design the mechanism to provide a variety of ignition timing characteristics. According to the present invention, a certain angular position of the crankshaft of an engine is taken as a reference point, and the retard angles from this reference positions are preliminarily programmed in accordance with variations in the number of revolutions of the engine and manifold vacuum, whereby in accordance with the conditions of the engine the corresponding retard angle is read out from the programs and it is then converted into the equivalent delay of the engine crankshaft from the moment at which is rotates past the said reference angular position, and the expiration of this delay time after the movement of the crankshaft past the reference angular position is then computed to determine the ignition timing. The control circuit according to the present invention is therefore free from deterioration with agee, capable of determining the correct ignition timing with very great accuracy, and capable of changing, as desired, the ignition timing characteristic by changing the programs.

4 Claims, 12 Drawing Figures

ELECTRONIC IGNITION TIMING CONTROL CIRCUIT FOR INTERNAL COMBUSTION ENGINE

BACKGROUND OF THE INVENTION

1. Field of the Invention

The present invention relates to an electronic ignition timing control circuit for electrically determining the ignition timing of an internal combustion engine.

2. Description of the Prior Art

In the conventional distributors widely used for determining the ignition timing of an engine, the relative positions of the component parts constituting the cam and electric contact assembly are varied in accordance with the number of revolutions of the engine and the magnitude of the intake manifold vacuum respectively detected by the centrifugal governor and the vacuum advancer to generate an ignition signal at the correct ignition points that suits the operating conditions of the engine. A disadvantage of these distributors is that since all of these distributors are of the mechanical type, the wear of the cam and the contact points tends to alter the timing of the ignition and it is also has a detrimental effect on durability, and moreover it is difficult to obtain the accurate knowledge of the ignition timing characteristics at the stage of designing and the alteration of the ignition timing characteristics is possible only within very narrow limits.

SUMMARY OF THE INVENTION

With a view to overcoming the foregoing difficulty, it is an object of the present invention to provide an electronic ignition timing control circuit for internal combustion engines in which on the basis of a reference angular position of an engine which may for example be 50° before the top dead center, the retard angle characteristic corresponding to the engine speed and the intake manifold vacuum is read out from predetermined programs, and the retard angle read out is then converted into a delay time from the moment at which the rotation of the engine passes the reference angular position to thereby compute the expiration of the delay time after passing the reference angular position to determine the ignition timing, thus eliminating deterioration with age, ensuring the control of ignition timing with very high accuracy, and permitting easy alteration as desired of the ignition timing characteristics through the program changes.

The control circuit according to this invention has among its remarkable advantages the fact that the change of ignition timing characteristics can be accomplished through a very easy means of simply changing the programs, and moreover it is possible to select a variety of ignition timing characteristics as desired.

Another remarkable advantage of the control circuit of this invention is in that the present invention can be incorporated in any engine without any material modification of the engine other than mounting a reference angular position detector on the engine crankshaft, and moreover there is no deterioration with age and the ignition timing can be controlled with very great accuracy as compared with the conventional mechanical type ignition timing controls with distributors.

A further remarkable advantage is in that all the necessary computational operations are performed with digital signals and therefore, as compared with the computational operations performed using analog signals, the computational operations can be performed with very great stability against variations of the external conditions, such as, power supply voltage and ambient temperature, and moreover the reduction of manufacturing costs and the standardization of assembling operations can be accomplished through the use of integrated circuits in the construction of circuitry.

A still further remarkable advantage is in that the time required for computational operations is decreased through minimal use of the operation of multiplication and division to thereby determine the ignition timing with very great accuracy and minimize the essential component parts with resultant improved reliability and simplification of the circuitry.

DESCRIPTION OF THE PREFERRED EMBODIMENT

The construction and operation of an ignition timing control circuit of this invention will now be described in greater detail with reference to the illustrated embodiment.

Figure 1:
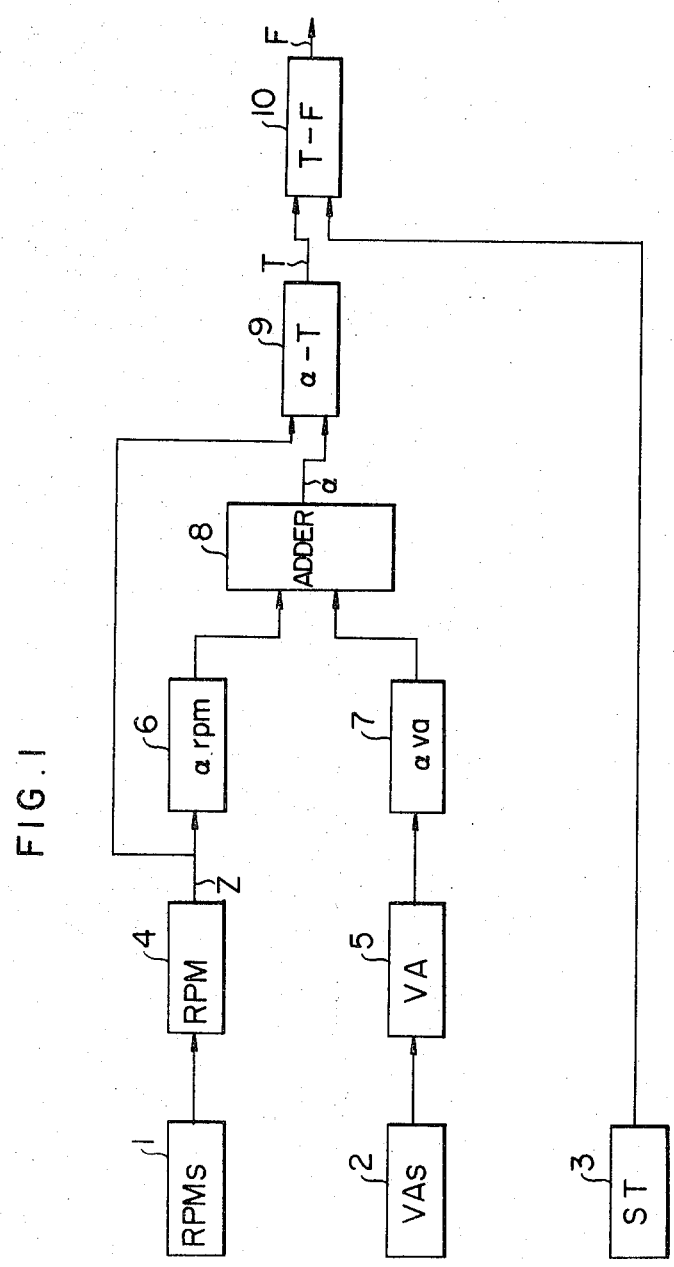
FIG. 1 is a block diagram showing an embodiment of an electronic ignition timing control circuit for internal combustion engines according to the present invention.
Figure 2:
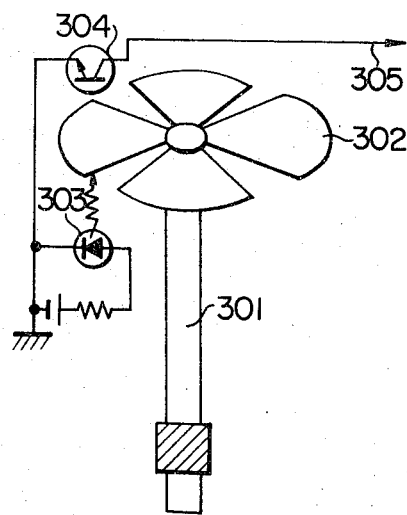
FIG. 2 is a schematic diagram showing an embodiment of the reference angular position detector used in the embodiment of FIG. 1.

Referring first to FIG. 1 illustrating a block diagram of an ignition timing control circuit of this invention, numeral 1 designates an electromagnetic pickup mounted to detect the number of revolutions of an engine by utilizing the ring gear thereof, so that if the number of teeth in the ring gear is 115, for example, the frequency of its output detected signals is 1,150 Hz during the engine operation of 600 r.p.m. Numeral 2 designates a vacuum detector for detecting the vacuum in the engine intake manifold, which may comprise, for example, a core movable in response to the manifold vacuum, an oscillator for converting the movement of the core into a voltage and a differential transformer, whereby the output of the oscillator is applied to the input winding of the differential transformer and the generated voltage in its output winding is smoothed out by a rectifying smoothing circuit to provide a DC output voltage which varies in accordance with the movement of the core to assume a value corresponding to the manifold vacuum. Numeral 3 designates a reference angular position detector for electrically detecting the reference angular position of the engine crankshaft to generate a reference angular position signal, and an embodiment of the detector 3 is shown in FIG. 2. In the detector of FIG. 2 which is applied to a four-cylinder engine, light shielding plates 302 are mounted on a distributor rotor shaft 301, whereby when the light shielding plate 302 comes between the associated light emitting diode 303 and phototransistor 304, the light is intercepted and the reference angular position is detected by means of an electric signal generated from an output terminal 305. Numeral 4 designates an engine revolution computing circuit whereby the output waveform from the electromagnetic pickup 1 is reshaped into a rectangular waveform and the duration time of one pulse is measured to represent the number of revolutions of the engine by a binary code. Numeral 5 designates an A-D converter for converting into a binary code the DC voltage from the vacuum detector 2 corresponding to the intake manifold vacuum. Numeral 6 designates a revolution read-only memory storing a program of retard angle characteristics corresponding to engine speeds by means of binary codes with the program corresponding to the characteristics shown in FIG. 4a or FIG. 5a. Numeral 7 designates a vacuum read-only memory storing a program of retard angle characteristics corresponding to variations of manifold vacuum by means of binary codes with the program corresponding to the characteristics shown in FIG. 4b or FIG. 5b. Numeral 8 designates an adder for producing the sum of binary code retard angle signals. Numeral 9 designates an angle-time conversion circuit whereby the output signal of the adder 8 representing the total retard angle from the reference angular position is divided by the number of revolutions of the engine at the time when the output signal was produced to convert it into a delay time from the reference angular position. Numeral 10 designates a timer circuit whereby the ignition timing is determined in accordance with the expiration of the delay time represented by the binary code output of the angle-time conversion circuit 9 from the moment of the generation of the reference angular position signal from the reference angular position detector 3.

Figure 3:
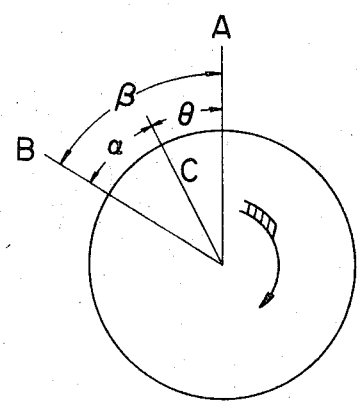
FIG. 3 is a schematic diagram showing exemplary positions of the engine crankshaft for explaining the operation of the embodiment of FIG. 1.

With the construction described above, the operation of the control circuit according to this embodiment will be described. For purposes of simplicity in the description of the ignition timing control according to this control circuit, the positions of the crankshaft which rotates in a clockwise direction are shown in FIG. 3 wherein point A represents the top dead center. Assuming now that it is desired to arrange so that the ignition occurs at point C, i.e., the required spark advance angle $\theta$ which is $\theta°$ before the top dead center A, then this required spark advance angle $\theta$ can be given in terms of a retard angle from a certain angle $\beta$ before the top dead center, as follows.

$$\theta = \beta - \alpha$$

Figure 4A:
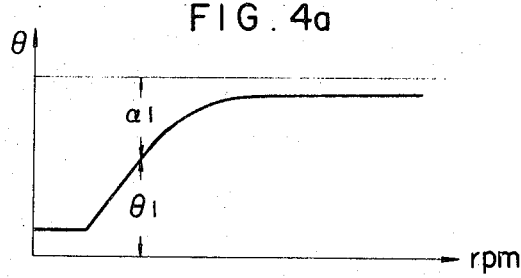
FIGS. 4a, 4b and FIGS. 5a, 5b are retard angle characteristic diagrams showing the programs stored in the read-only memories used in the embodiment of FIG. 1.
Figure 4B:
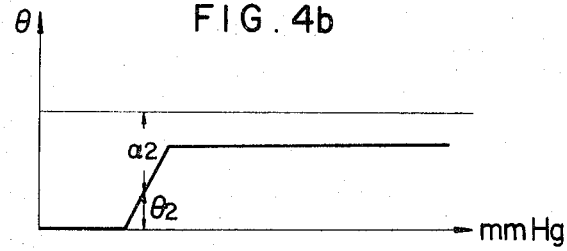
Figure 5A:
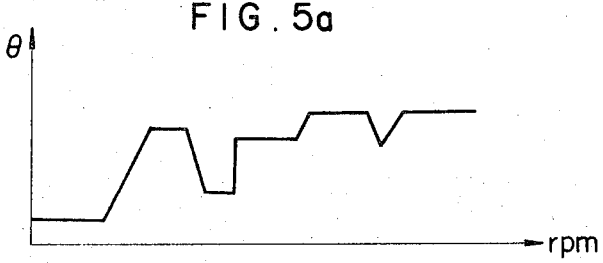
Figure 5B:
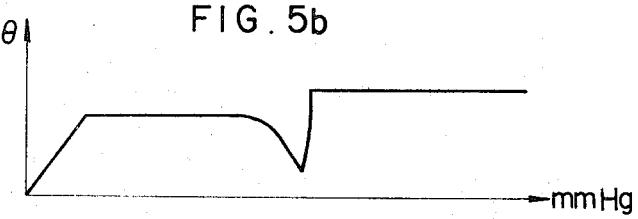

If the reference angular position of the crankshaft is set at point B which is $\beta°$ before the top dead center A, the required spark advance angle $\theta$ can be expressed in terms of the retard angle $\alpha$ from the point B. In other words, since the speed advance $\theta_1$ and the vacuum advance $\theta_2$ in FIGS. 4a and 4b are in an additive relation, the added value $\alpha$ of the respective retard angles $\alpha_1$ and $\alpha_2$ represents the total retard angle. Since this value represents the angle of rotation of the crankshaft, this angle may be given in terms of a delay time from the reference angular position or the point B by dividing the retard angle $\alpha$ by the number of revolutions of the engine at the corresponding instant as shown by the following equation (a)

$$T = K_1 \cdot \alpha / Z \qquad (a)$$

where Z is the number of revolutions of the engine, T is the delay time between the generation of the reference position detecting signal and the ignition point, and $K_1$ is a proportionality constant.

In this case, the above equation (a) holds on the assumption that the engine rotates at a constant speed from the moment of detecting the engine revolutions Z to the moment of occurrence of the ignition signal, and therefore this equation (a) may be made a more accurate approximation provided that the degree of the total retard angle $\alpha$ is made as small as possible, that the calculation of the engine revolutions is carried out at a point close to the reference angular position or the point B and that the measuring time is reduced as far as possible. When the delay time T has been calculated in this manner, the timer circuit 10 determines so that the ignition takes place at the moment when the actual delay time T from the occurrence of the reference angular position detecting signal expires, thereby correctly timing the ignition to occur at the required spark advance angle $\theta$.

The individual circuits shown in FIG. 1 will now be described in greater detail. With the engine revolution computing circuit 4, it is essential to obtain an accurate value of the engine revolutions Z with a minimum time as mentioned earlier. Therefore, the engine revolutions Z is obtained from the following equation (b)

$$Z = K_2 \cdot X / Y \qquad (b)$$

where X is the number of output waves generated from the electromagnetic pickup 1 attached to the ring gear (i.e., the circumference of the ring gear), Y is the number of clock pulses (of 400 KHz in this embodiment) arrived during the time when X teeth of the ring gear rotate, and $K_2$ is a proportionality constant. To provide an improved accuracy, the value of Y is selected greater than 480 so that when the value of Y becomes greater than 480 and when an output wave by the next tooth of the ring gear is applied, the counts of the X and Y are read out and processed to calculate the number of revolutions of the engine.

Figure 6:
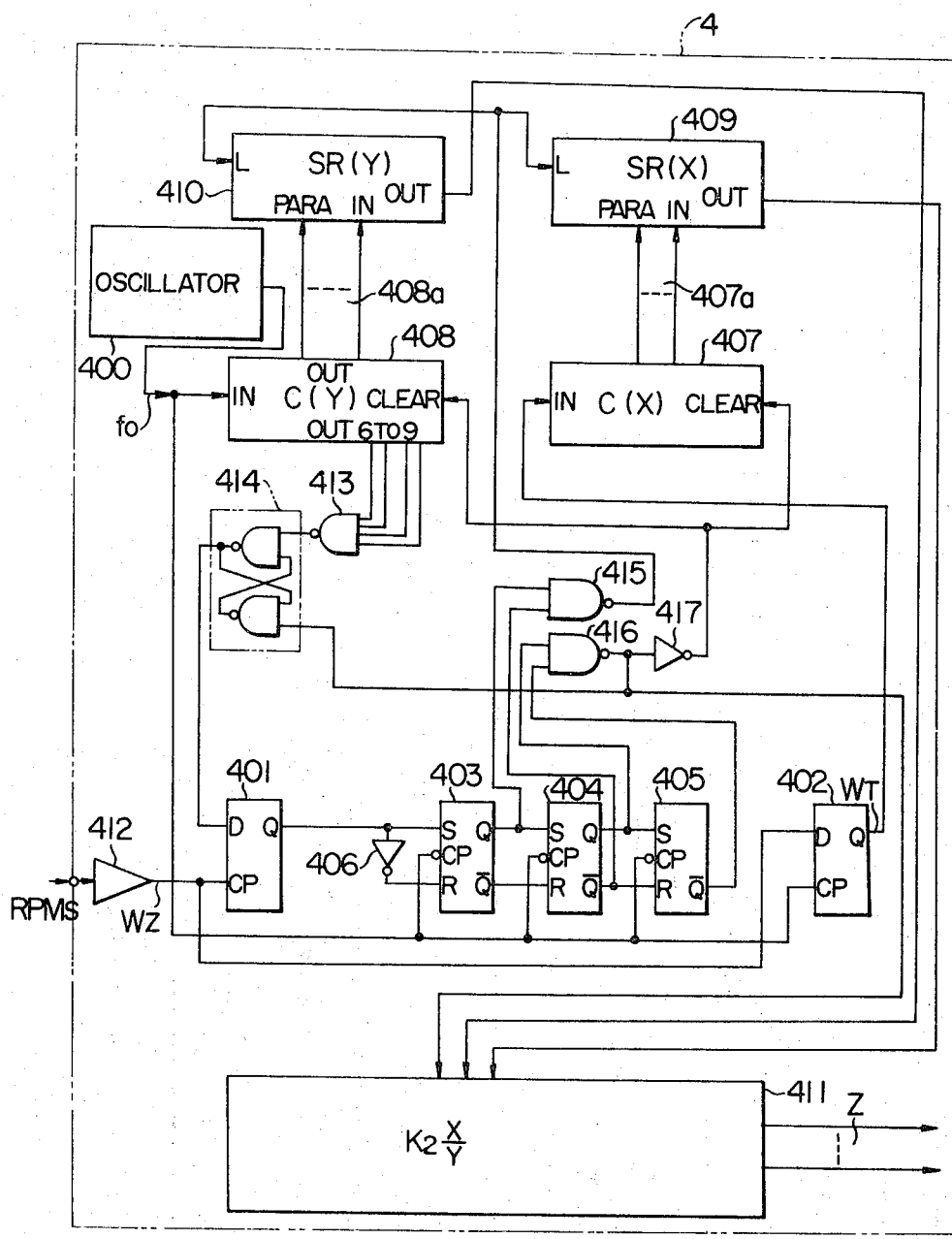
FIGS. 6 and 7 show respectively a wiring diagram showing a detailed exemplary circuit construction of the revolution computing circuit used in the embodiment of FIG. 1 and a waveform diagram for explaining the operation thereof.
Figure 7:
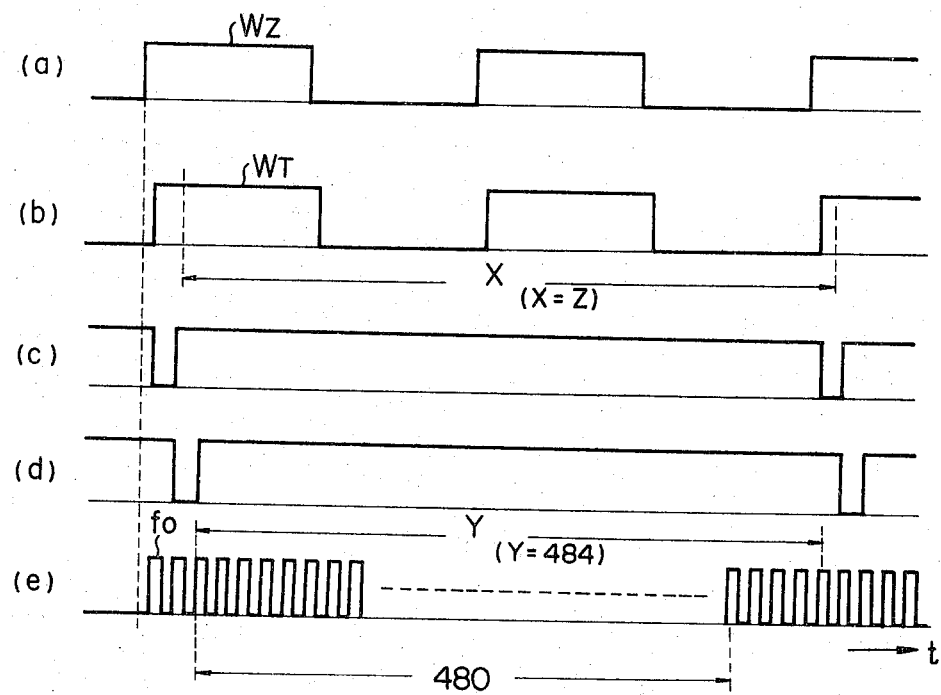

The detailed circuit construction and the operation of the engine revolution computing circuit 4 will be described with reference to the wiring diagram of FIG. 6 and the time chart of FIG. 7. In FIG. 6, numeral 400 designates an oscillator for generating 400-KHz clock pulses $f_0$, 401 and 402 D flip-flops, 403, 404, 405 and 406 RS master-slave flip-flops and an inverter constituting a shift register, 407 and 408 binary counters which may for example be SN74193 manufactured by Texas Instruments Inc. of U.S.A. (hereinafter refereed to as TI) respectively generating an 8-bit count output 407a and a 16-bit count output 408a. Numerals 409 and 410 designate 16-bit shift registers for generating an output pulse train in serial form corresponding to an input value applied in parallel form, and these may for example be TI SN74165 of 16-bit type. The input to the shift register 409 from the counter 407 is coupled with the shifting by four places. Numeral 411 designates a multiplying and dividing circuit, 412 an amplifier, 413, 415 and 416 NAND gates, 414 an RS flip-flop, 417 an inverter. When an output revolution detecting signal WZ of the amplifier 412 for reshaping and amplifying the detected signal of the electromagnetic pickup 1 goes to "1", the D flip-flop 402 produces at its output an output signal WT (FIG. 7(a)) synchronized with the first one of the next series of clock pulses $f_0$ from the oscillator 400. The NAND gate 415 continues to generate a "0" signal until the arrival of the succeeding second pulse and this "0" signal transfers the counts of the counters 407 and 408 to the shift registers 409 and 410. The NAND gate 416 continues to produce a "0" signal at its output until the third pulse arrives, whereby this "0" signal resets the RS flip-flop 418 for storing that the clock pulses have reached 480 as well as the counters 407 and 408, and it is also used as an operation start signal for the multiplying and dividing circuit 411. At the instant that the "0" signal from the NAND gate 416 terminates, the counters 407 and 408 restart to count respectively the X or the frequency of the output signal WT and the Y or the frequency of the clock pulses $f_0$. When the count of the counter 408 attains 480, the NAND gate 413 generates a "0" signal so that the RS flip-flop 414 changes its state. The output of the RS flip-flop 414 is applied to a data terminal D of the D flip-flop 401. Thereafter, at the moment that the revolution detecting signal WZ goes to "1", the signal at an output terminal Q of the D flip-flop 401 goes to "1", and the NAND gates 415 and 416 are caused to successively generate at their output a "0" signal through the RS master-slave flip-flops 403, 404 and 405 to which the clock pulses $f_0$ are applied. In the exemplary case shown in FIG. 7, at the instant when the NAND gate 415 generates the "0" signal, the count of the counter 407 is 2 and the count of the counter 408 is 484, and these counts are respectively transferred in parallel to the shift registers 409 and 410. Thereafter, the "0" signal from the NAND gate 416 resets the RS flip-flop 414 and the counters 407 and 408 and the multiplying and dividing circuit 411 commences its computational operation. This operation causes the counts of the shift registers 409 and 410 to be successively read out and processed to produce at the output of the circuit 411 a 7-bit revolution signal Z representing the number of revolutions of the engine. The multiplying and dividing circuit 411 is of a conventional type and the value of the proportionality constant $K_2$ used in the operation of multiplication and division is given as follows provided that the frequency of the clock pulses $f_0$ is 400 KHz, the number of teeth in the ring gear is 115 and the number of revolutions is 50 rpm/div.

$$K_2 = 60/50 \cdot f_0/115 = 8{,}000 \cdot 12/23$$

In the above-described computation of the engine revolutions, the revolution measurement time is ranging from 480·1/400 msec to 960·1/400 msec, and it may be said that this measuring method takes the advantages of both the fixed distance system and the fixed time system. Since it is possible for the multiplying and dividing circuit 411 to perform the required computation within this measurement time in consideration of its operation, the accurate measurement of engine revolutions can be made within the above-mentioned minimum period of time with the maximum error of less than about 0.5 percent. By using the value of this engine revolution signal Z, the corresponding address in the revolution read-only memory 6 storing the program of the value of the required spark advance angle $\theta_1$ converted into the retard angle $\alpha_1$ is specified to read out the retard angle $\alpha_1$. In the present embodiment, the retard angle $\alpha_1$ consists of a 7-bit signal. On the other hand, the DC signal from the manifold vacuum detector 2 is converted into a digital signal through the conventional A-D converter 5, and by using the value of this digital signal the corresponding address in the vacuum read-only memory 7 storing the program of the value of the required spark advance angle $\theta_2$ converted into the retard angle $\alpha_2$ is specified to read out the retard angle $\alpha_2$. In the present embodiment, the retard angle $\alpha_2$ consists of a 5-bit signal. Assuming that in FIG. 3 the value of the angle $\beta$ is 50°, the speed advance angle is 35° and the vacuum advance angle is 15°, then $\alpha_1 = 35° - \theta_1$ and $\alpha_2 = 15° - \theta_2$. Further, since the total advance angle $\theta$ is given as $\theta = \theta_1 + \theta_2$, the total retard angle $\alpha$ is obtained by producing the sum of the retard angles $\alpha_1$ and $\alpha_2$. This total retard angle $\alpha$ is then applied to the angle-time conversion circuit 9 which operates thereon in accordance with the equation (a) ($T = K_1 \cdot \alpha/Z$) to convert it into the corresponding delay time. The actual ignition timing at the expiration of the delay time after the generation of the reference angular position signal ST is determined by the timer circuit 10.

Figure 8:
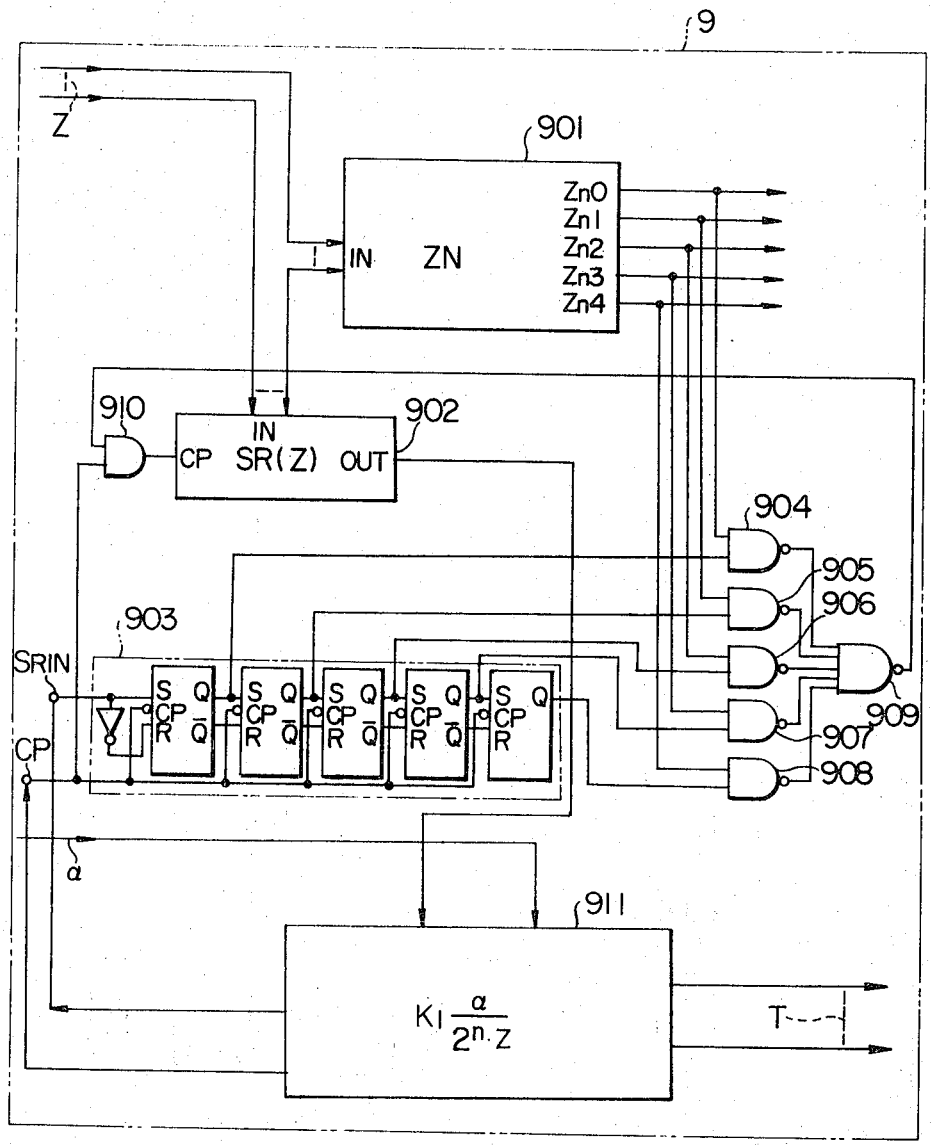
FIG. 8 is a wiring diagram showing a detailed exemplary circuit construction of the angle-time conversion circuit used in the embodiment of FIG. 1.
Figure 9:
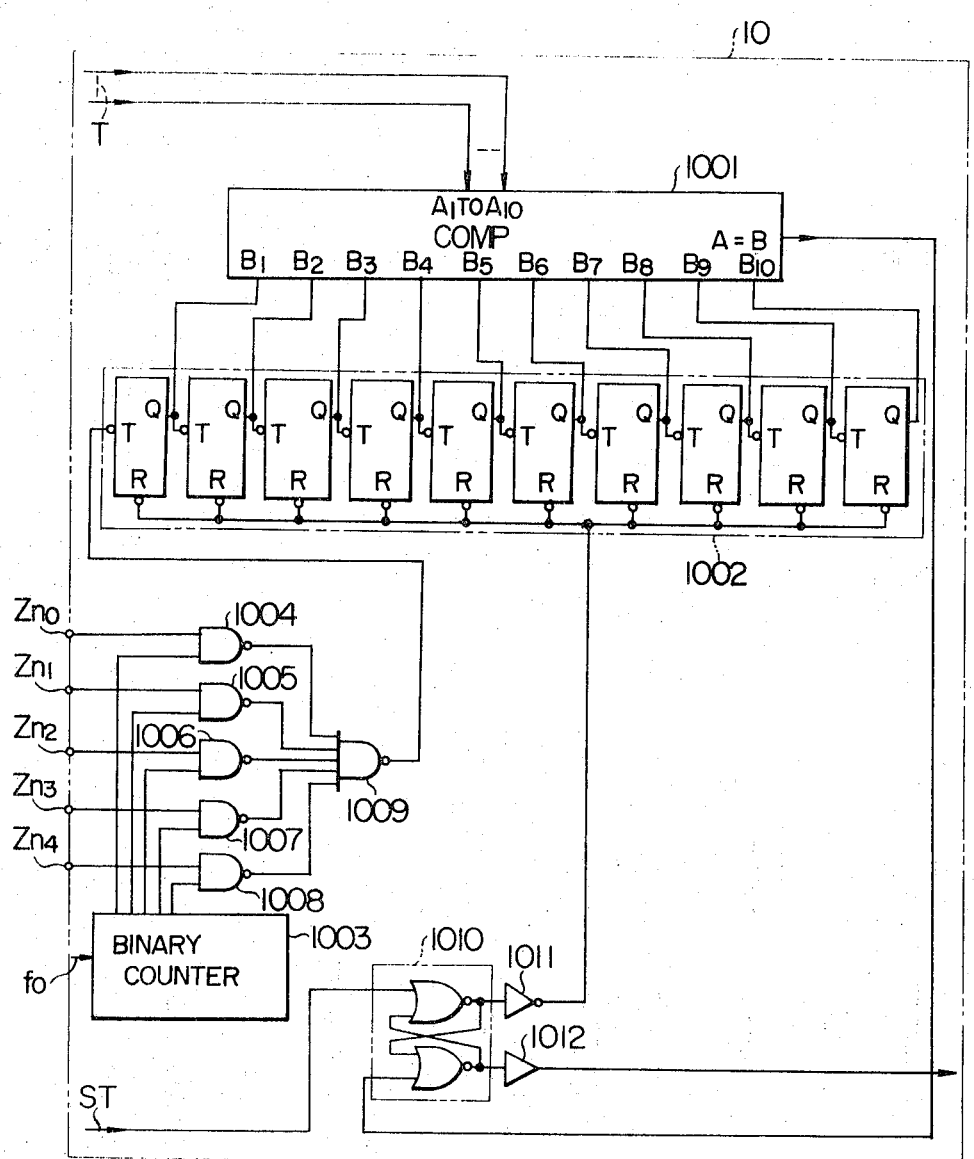
FIGS. 9 and 10 show respectively a wiring diagram showing a detailed exemplary circuit construction of the timer circuit used in the embodiment of FIG. 1 and a waveform diagram for explaining the operation thereof.
Figure 10:
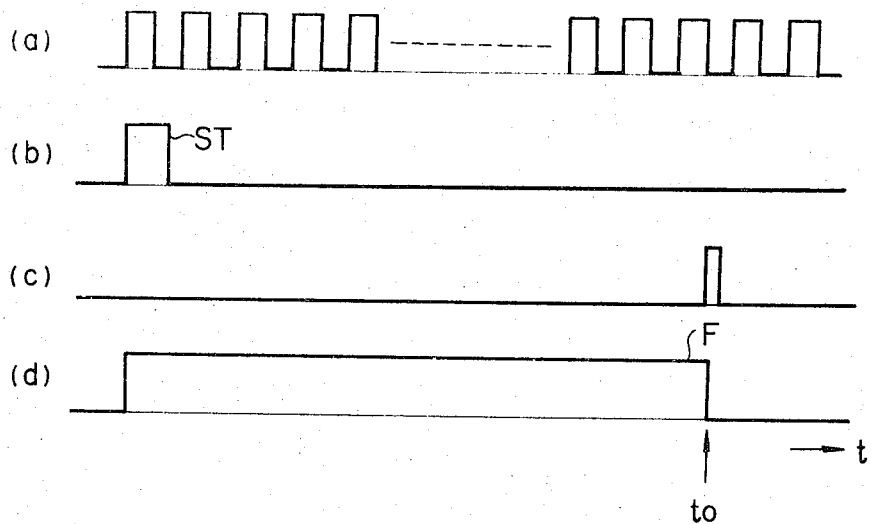

FIG. 8 illustrates a detailed circuit diagram of the angle-time conversion circuit 9, and FIG. 9 illustrates a detailed circuit diagram of the timer circuit 10 whose waveform diagram is illustrated in FIG. 10. The angle-time conversion circuit 9 and the timer circuit 10 will now be described in greater detail with reference to FIGS. 8, 9 and 10. The timer circuit 10 determines the expiration of a delay time by counting timer clock pulses. Consequently, the angle corresponding to each clock pulse increases as the engine speed increases with corresponding increase in error. For this reason, the frequency of the timer clock pulses is increased at higher engine speeds to prevent the occurrence of error.

In other words, the range of speed is divided into five speed zones of 3,200 rpm and above, 1,600–3,200 rpm, 800–1,600 rpm, 400–800 rpm and 400 rpm and below, and these five speed zones are designated respectively as Zn0, Zn1, Zn2, Zn3 and Zn4. Thus, for the engine speeds corresponding to the speed zone Zn0, the corresponding frequency of timer clock pulses in the timer circuit 10 is selected 100 KHz, 50 KHz for the speed zone Zn1, 25 KHz for the speed zone Zn2, 12.5 KHz for the speed zone Zn3 and 6.25 KHz for the speed zone Zn4. Therefore, in order to vary the value computed from the above equation (a) ($T = K_1 \cdot \alpha/Z$) in accordance with the respective speed zones, the number of revolutions Z is varied in this embodiment. In other words, since the above-mentioned frequency of the timer clock pulses varies in accordance with $1/2^n \cdot 100$ KHz ($n = 0$–$4$), the above equation (a) may be modified as follows $$T = K_1 \cdot \alpha / 2^n \cdot Z$$

where the unit of T is $[2^n/f_T]$, $f_T = 100$ KHz and the value of $K_1$ is given as $K_1=0.5 \cdot f_T/(50/60) \cdot 360 = 500/3$ provided that the unit of $\alpha$ is 0.5°. In fact, therefore, the number of transfer clock pulses for reading out the value of the revolution signal Z is controlled. In this way, in the operation where the least significant bit of data comes first, decreasing the number of transfer clock pulses by one means that the value of the revolution signal Z is doubled.

The angle-time conversion circuit 9 for performing the previously mentioned angle-time conversion will be described in detail with reference to FIG. 8. In FIG. 8, numeral 901 designates a speed zone discrimination circuit comprising a digital comparator such as the TI SN7485 for discriminating the 7-bit revolution signal Z in accordance with the above-mentioned five speed zones Zn0, Zn1, Zn2, Zn3 and Zn4 to always generate a "1" signal at one of its zone discrimination terminals Zn0, Zn1, Zn2, Zn3 and Zn4. Numeral 902 designates a shift register for receiving the 7-bit revolution signal Z, and it may for example be the TI SN74165. Numeral 903 designates a parallel out shift register in which a "1" signal at an input terminal SRIN causes a "1" signal to be produced successively at each of the parallel out output terminals by means of the transfer clock pulses applied to a terminal CP, and it may for example be the TI SN 74164. Numerals 905, 906, 907, 908 and 909 designate NAND gates and numeral 910 designates an AND gate. Numeral 911 designates a delay time computing circuit whereby the total retard angle $\alpha$ from the adder 8 is divided by the then current engine revolutions to generate a delay time signal T. Assuming now that the 7-bit revolution signal Z delivered from the output terminal of the revolution computing circuit 4 is applied to the speed zone discrimination circuit 901 and the shift register 902, a "1" signal is always generated at one of the five zone discriminating terminas Zn0, Zn1, Zn2, Zn3 and Zn4 for the above-mentioned speed zones Zn0 through Zn4. Then, at the instant when the value of the revolution signal Z is to be written into the delay time computing circuit 911, the signal at the terminal SRIN goes to "1". Thereafter, as the transfer clock pulses for writing data are supplied from the delay time computing circuit 911 to the terminal CP, the respective inputs of the NAND gates 904, 905, 906, 907 and 908 connected to the shift register 903 successively have a "1" signal. In this case, if, for example, the engine speed is in the zone Zn2, the NAND gate 906 generates a "1" signal and applies it to the NAND gate 909. Then, when the signal at the terminal SRIN has gone from "0" to "1" and the two transfer clock pulses have passed through the terminal CP, the NAND gate 910 opens and passes the transfer clock pulses to the shift register 902 to transfer the data to the delay time computing circuit 911. In other words, the shift register 903 and the speed zone discrimination circuit 901 have deleted the two transfer clock pulses and performed the computation $2^2 \cdot Z$.

The delay time computing circuit 911 also receives the output of the adder 8 representing the total retard angle $\alpha$ and operates on the input data to generate a 10-bit delay time signal T. The result of this operation is applied to the timer circuit 10 to provide the actual delay time.

The detailed circuit construction of the timer circuit 10 is illustrated in FIG. 9, and the waveforms generated at various points in the timer circuit 10 are shown in FIG. 10. In FIG. 9, numeral 1001 designates a digital comparator for comparing 10-bit binary codes and it may for example be the TI SN 7485. Numeral 1002 designates a 10-bit binary counter, 1003 a 6-bit binary counter comprising for example the TI SN7493, whereby the 400-KHz clock pulses $f_0$ from the oscillator 400 in the revolution computing circuit 4 are subjected to the operation of frequency division and the output signals or timer clock pulses respectively having different frequencies of 100 KHz, 40 KHz, 25 KHz, 12.5 KHz and 6.25 KHz are respectively applied to five output terminals. Numerals 1004, 1005, 1006, 1007, 1008 and 1009 designate NAND gates for selectively passing the timer clock pulses in accordance with the signals at the zone discriminating terminals Zn0, Zn1, Zn2, Zn3 and Zn4. Numeral 1010 designates as RS flip-flop, 1011 an inverter, 1012 a buffer. The 10-bit delay time signal T from the angle-time conversion circuit 9 is applied to one inputs $A_1$ through $A_{10}$ of the digital comparator 1001 and the output signal of the binary counter 1002 is applied to the other input terminals $B_1$ through $B_{10}$. The frequency of the timer clock pulses applied to the binary counter 1002 is selected by the NAND gates 1004, 1005, 1006, 1007 and 1008 and they are introduced through the NAND gate 1009. Assuming now that a "1" signal is placed at the zone discriminating terminal Zn2, the timer clock pulses applied to the binary counter 1002 through the NAND gate 1009 have a frequency of 25 KHz.

Referring to the time chart shown in FIG. 10, FIG. 10(a) shows the waveform of the timer clock pulses applied to the binary counter 1002, FIG. 10(b) shows the waveform of the reference angular position signal ST from the crankshaft reference angular position detector 3, FIG. 10(c) shows the waveform of an equality signal produced when the two inputs to the comparator 1001 are found to be equal to each other, and FIG. 10(d) shows the waveform of ignition timing control signal F produced by amplifying the output of the RS flip-flop 1010 through the buffer 1012, and a time $t_0$ at which this ignition timing control signal F goes from "1" to "0" indicates the correct ignition timing. When the reference angular position signal ST shown in FIG. 10(b) goes from "0" to "1", the RS flip-flop 1010 changes its state and the binary counter 1002 is released by the inverter 1011 from its reset state to start counting. When the count of the binary counter 1002 becomes equal to the value of the delay time signal T, the equality signal shown in FIG. 10(c) is generated at the output terminal A=B of the comparator 1001 causing the RS flip-flop 1010 to change its state. This results in the production of the ignition timing control signal F which determines the ignition timing.

While, in the above-described embodiment of this invention, the computational expressions $K_2 \cdot X/Y$ and $K_1 \cdot \alpha/2^n \cdot Z$ are used with the revolution computing circuit 4 and the angle-time conversion circuit 9, it is of course possible to obtain satisfactory results with the use of only the fundamental expressions $K_2 \cdot 1/Y$ and $K_1 \cdot \alpha/Z$ provided that variations of the accuracy are disregarded. Further, these calculations may be performed by any commercially available computer, and it is also possible to perform the required computational operations in a time shared manner.

Furthermore, while only the two control factors, i.e., the engine speed and the intake manifold vacuum are stored in the read-only memories 6 and 7, other factors such as the engine temperature and EGR may easily be added to the control factors by simply using additional read-only memories to supply their values to the adder 8. Moreover, while the read-only memories 6 and 7 store the programs of the retard angles $\alpha_1$ and $\alpha_2$, the same effect as the present embodiment may of course be obtained if the read-only memories 6 and 7 store the programs of the required spark advance angles which are added and the value of the reference angular position is preliminarily placed in a subtraction circuit to subtract this value from the added total spark advance angle.

Still furthermore, the order of the operations by the adder 8, the angle-time conversion circuit 9 and the timer circuit 10 may be interchanged.

The advantages of the embodiment of this invention described hereinbefore are summarized as follows:

1. Since the signals used in the computing circuits are all in digital form, the computational operations can be performed with greater stability against variations of the external conditions such as variations of the power supply voltage and ambient temperature.
2. Since the entire circuitry is constructed with digital computing elements, it is possible to reduce the manufacturing costs and achieve the standardized assembling operations through the use of integrated circuits.
3. When the modification of the designed characteristics is required due to the change of application of the engine or for a different class of engine, this can be effected simply by changing the stored programs of the read-only memories, and any desired characteristics can be readily obtained.
4. The present invention can be incorporated simply by mounting a reference angular position detector on the crankshaft of an engine, and the detector can be mounted on any class of presently available engines requiring no additional modification.

What is claimed is:

1. An electronic ignition timing control system for an internal combustion engine comprising:

engine operating condition detecting means including at least revolution detecting means for detecting the number of revolutions of the engine and producing an electrical output signal which varies as a function of speed of revolution;

ignition timing selection means for reading out from a predetermined ignition timing characteristic program an ignition timing characteristic corresponding to the output signal of said detecting means as a retard angle from a reference angular position of an engine crankshaft;

an angle-time conversion circuit connected to said revolution detecting means for receiving said electrical signal and said ignition timing selection means for dividing the output signal of said ignition timing selection means by the output signal of said revolution detecting means to convert said retard angle into a period of time corresponding to the speed of revolution at the moment of the detection of the engine revolutions by said detecting means;

reference angular position detecting means for detecting said reference angular position of said engine crankshaft; and timer means connected to said angle-time conversion circuit and said reference angular position detecting means for generating an ignition signal when said crankshaft has rotated from said reference angular position for the duration of said time period obtained from said angle-time conversion means.

2. An ignition timing control system according to claim 1, wherein said engine operating condition detecting means further includes engine vacuum detecting means.

3. An ignition timing control system according to claim 2, further comprising:

another ignition timing selection means for reading out from another predetermined ignition timing characteristic program an ignition timing characteristic corresponding to the output signal of said vacuum detecting means as a retard angle from said reference angular position.

4. An ignition timing control system according to claim 1, further comprising:

adding means for producing the sum of the output signals from said plurality of ignition timing selection means.

* * * * *